Nov. 24, 1936.   B. J. HASKINS   2,062,173
APPARATUS FOR MEASURING THE FLOW OF AUTOMOBILE FUEL PUMPS
Filed Dec. 23, 1933   4 Sheets-Sheet 2

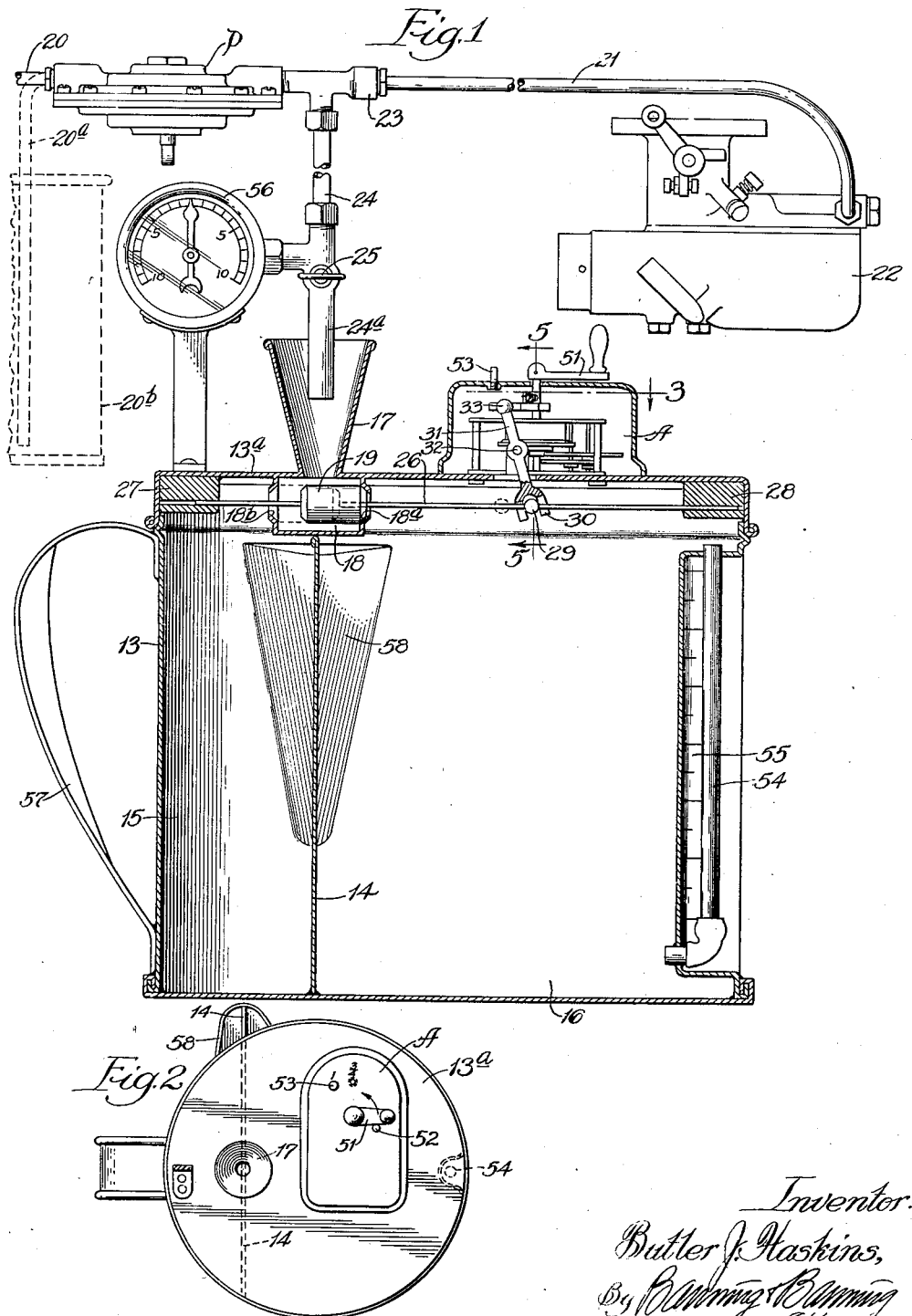

Inventor:
Butler J. Haskins,
By Banning & Banning
Attys.

Nov. 24, 1936.  B. J. HASKINS  2,062,173
APPARATUS FOR MEASURING THE FLOW OF AUTOMOBILE FUEL PUMPS
Filed Dec. 23, 1933  4 Sheets-Sheet 3

Inventor:
Butler J. Haskins,
By Banning & Banning
Attys.

Nov. 24, 1936.  B. J. HASKINS  2,062,173
APPARATUS FOR MEASURING THE FLOW OF AUTOMOBILE FUEL PUMPS
Filed Dec. 23, 1933  4 Sheets-Sheet 4
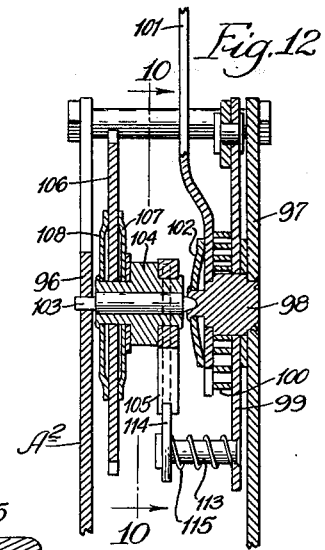
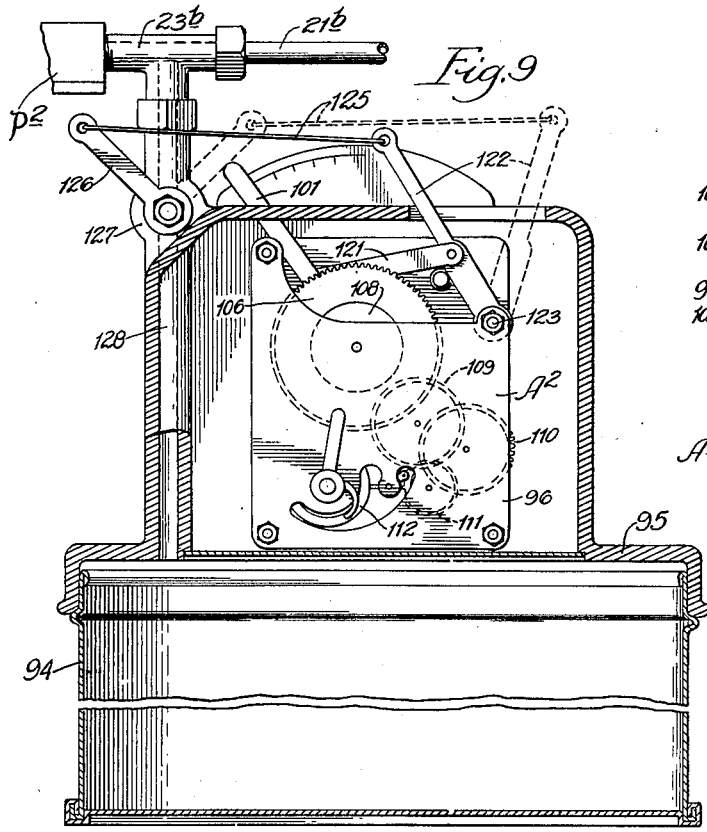
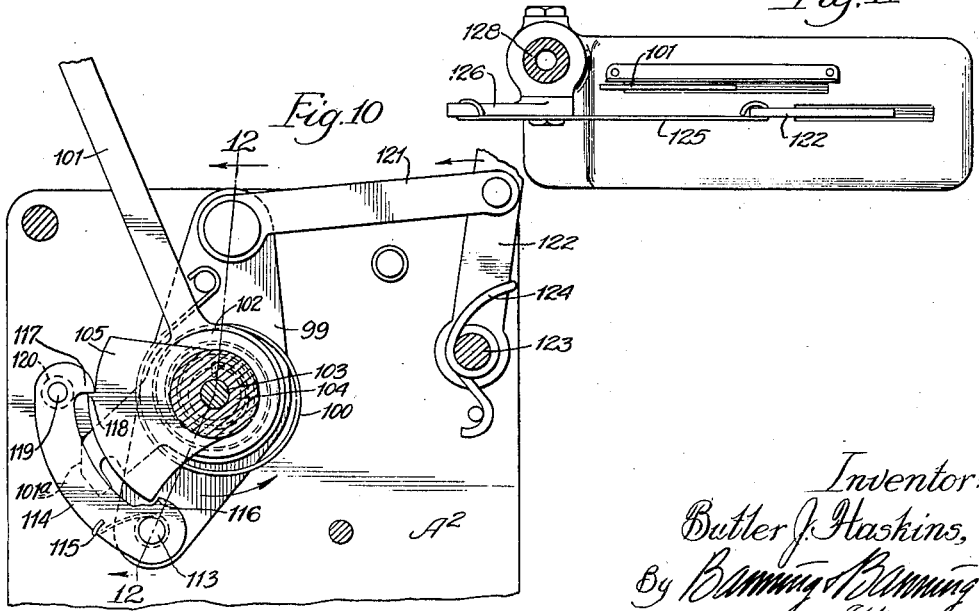
Inventor:
Butler J. Haskins,
By Banning & Banning
Attys.

Patented Nov. 24, 1936

2,062,173

UNITED STATES PATENT OFFICE 2,062,173

APPARATUS FOR MEASURING THE FLOW OF AUTOMOBILE FUEL PUMPS

Butler J. Haskins, Chicago, Ill., assignor to Joseph Weidenhoff, Inc., Chicago, Ill., a corporation of Illinois Application December 23, 1933, Serial No. 703,718

9 Claims. (Cl. 73—51)

An object of this invention is to provide means for measuring the flow of a fuel pump while assembled in an automobile, and for determining the characteristics and faults of the pump.

Another object is to provide apparatus for accomplishing this purpose which can be attached to the fuel pump with a minimum of effort and time, and which will not interfere in any way with the action of the pump when driven by the engine in the usual way.

Another object is to provide a self-contained means for thus measuring the flow of fuel delivered by the pump for a given period of time.

These and other objects, as will hereinafter appear, are accomplished by this invention which is fully described in the following specification and shown in the accompanying drawings, in which—

Figure 1 is a vertical section through such a measuring device shown applied to a fuel pump;

Fig. 2 is a reduced plan view of the same;

Fig. 3 is an enlarged horizontal section on the line 3 of Fig. 1 showing the clockwork mechanism in the off or inoperative position;

Fig. 4 is the same in the wound up or operative position;

Fig. 5 is an enlarged vertical section on the line 5—5 of Fig. 1;

Fig. 6 is a slightly enlarged horizontal section on the line 6 of Fig. 5;

Fig. 9 is a vertical section through still another modification of the measuring device;

Fig. 10 is a vertical section on the line 10—10 of Fig. 12;

Fig. 11 is a top plan view of the clockwork mechanism of Fig. 9; and

Fig. 12 is a section on the broken line 12—12 of Fig. 10.

Figure 7:
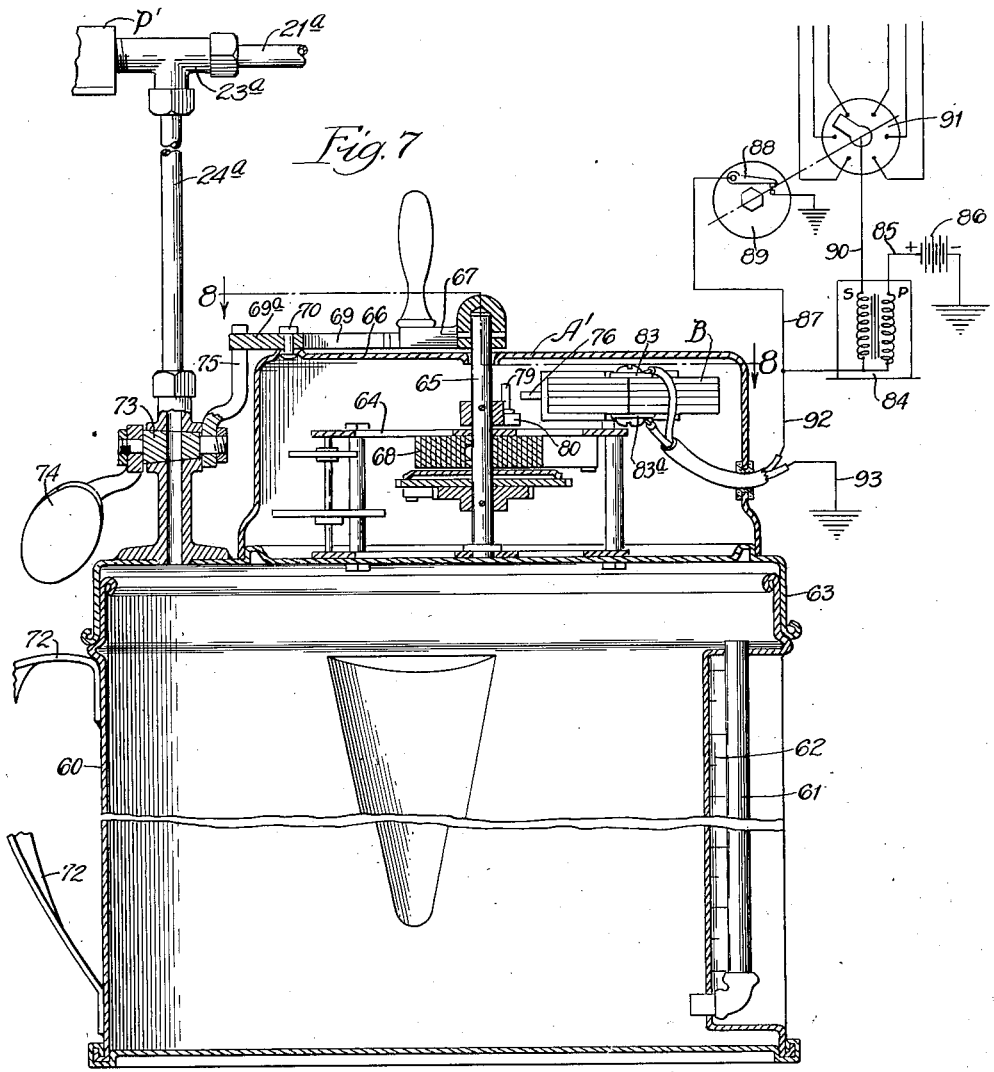
Fig. 7 is a vertical section through a modified form of the measuring device.

The embodiment shown in Figs. 1 to 6 inclusive consists essentially in a can 13 having a partition 14 therein which divides the can into a waste chamber 15 and a measuring chamber 16 both connected to a funnel 17, through to a passage 18 in which is located a double acting valve 19 by means of which fluid fed to the funnel 17 may be caused to flow to either of the chambers 15 or 16, the valve 19 being controlled by a clockwork mechanism A, which will later be described in detail.

This measuring device is shown in Fig. 1 as associated with the automobile fuel pump P which is driven by the automobile engine in any well known manner, and which has an intake pipe 20 connected to the fuel supply tank (not shown) and a delivery pipe 21 connected to the carburetor 22 by means of a float controlled valve, not shown. A T-fitting 23 is inserted between the pipe 21 and the pump P, and has a leg to which is connected a flexible hose 24 in which is placed a valve 25. The lower end of the hose 24 delivers into the funnel 17 and is held so as not to be lower than the entrance of the pipe 21 into the carburetor 22, otherwise the pipe 24ᵃ will have a tendency to siphon all fuel from the carburetor, thereby preventing the carburetor from getting its normal supply of fuel and causing the engine to stop for want of fuel.

The valve 19 (Fig. 1) is shown closing the valve seat 18ᵃ at the right end of the passage 18, so that any fuel which might be delivered to the funnel from the pipe 24ᵃ would pass through the valve seat 18ᵇ into the waste chamber 15. The valve 19 is mounted on a wire 26 which is slidably mounted at its two ends in guides 27, 28 which are carried by the cover 13ᵃ. The wire 26 carries a ball 29 which is engaged by means of bifurcated fingers 30 on a lever 31 which is pivotally mounted at 32, and which has a spherical upper end 33 which engages a snap lever 34 which is pivotally mounted at 35 on the frame 36 of the clockwork mechanism. The snap lever 34 is connected by means of a spring 37 with the outer end of a short lever 38 which is pinned to a shaft 39 which is suitably journaled in the framework of the clock mechanism, and is firmly connected to the inner end of the clockwork spring 40.

The shaft 39 has fixedly mounted thereon a ratchet 41 which, as it is turned in a clockwise direction, as shown in Fig. 6, passes under the spring-pressed pawl 42 which is mounted on a pivot 43 on a gear 44, the latter being journaled on the shaft 39. This gear drives through the gear train 45, 46 to an escapement wheel 47 in a well known manner. An escapement lever 48 engages this escapement wheel and is connected to a balance wheel 49 which carries a hair spring 50 (Fig. 3). The details of this clockwork mechanism are not shown for the reason that they are so well known. The shaft 39 carries an operating lever 51 which is normally urged by the spring 40 toward its inoperative position, as shown in Fig. 2, in which it is stopped by the pin 52.

The degree to which the lever 51 is drawn back determines the length of time during which the mechanism will run once it is set in operaton.

Thus for fuel pumps of certan types it is desirable that the amount pumped in one minute should be measured, whereas for other types it is preferable to measure the amount pumped in forty-five seconds. For this reason I have provided a stop pin 53 which may be screwed into the housing of the clockwork mechanism, as shown in Figs. 1 and 2, as either of the points shown in Fig. 2 corresponding to forty-five seconds and to one minute as there indicated.

Thus for one type of pump it should deliver one pint in one minute, whereas another type of pump should deliver one pint in forty-five seconds. The pin 53 is then inserted in the hole corresponding to the time desired. On drawing the lever 51 back it strikes the pin, but before doing so the short lever 38 has passed the dead center of the snap lever 34, and has caused this lever to shift, thereby shifting the valve 19 from the full line position of Fig. 1 to the dotted line position.

It will be understood that with this type of measuring device the automobile engine will be idling at a speed corresponding to a road speed of thirty to thirty-five miles per hour, and that the valve 25 will be opened just prior to setting the operating lever 51. Thus with the lever 51 in the inoperative position fuel will flow into the waste chamber 15 until such time as the lever 51 is moved over until it strikes the pin 53. Thus the clockwork mechanism will be set in motion at the same time that gasoline from the hose 24 begins to flow into the measuring chamber 16. The clockwork mechanism will then continue to run until the short lever 38 is moved thereby to its position shown in Fig. 3, whereupon the spring 37 will pass over dead center of the pin 35 and cause the snap lever 34 to shift to the left, thereby moving the valve 19 to the right (Fig. 1).

Thus the clock mechanism will be brought to a stop at the same instant that the valve 19 stops the flow of gasoline into the measuring chamber 16 and diverts it to the waste chamber 15. The operator then shuts off the valve 25. The measuring chamber is provided with a glass 54 alongside which is a suitable graduated scale 55, so that the quantity of gasoline in the measuring chamber is indicated thereon in terms of fractions of a pint. A pressure gauge 56 (Fig. 1) may be mounted on the cover of the measuring device, and has a passage (not shown) connecting with the line 24 just above the valve 25. The pressure which the pump P should exert varies with different makes of pumps, but is usually between three and one-half and five pounds.

In making the test for pressure the engine is run at the lowest idling speed and the pressure of the line delivering to the carburetor is then read on the pressure gauge 56, which is graduated in terms of pounds per square inch of pressure on said line. If the pressure observed exceeds the allowable pressure (say three and one-half pounds) for a given carburetor, the pump springs should be adjusted to lower this pressure. Too much pressure means too high a level of fuel in the carburetor or even flooding.

Should the test previously described show that the amount of fuel in the predetermined period of time as measured by the clockwork mechanism is less than that which is to be expected from a pump of this type, the fault may lie not in the pump itself but in the intake line 20. As a check on this line it may be disconnected from the pump and a line 20ª (Fig. 1) may be connected to the pump and this draws from a can 20ᵇ which is held quite close to the pump so as to produce a very small vacuum in the line 20ª. With the parts thus connected the engine is again run at a speed equivalent to a road speed of about 30 to 35 miles per hour. With the chambers 15, 16 empty the valve 25 is again opened, the lever 51 set and released, and the measuring test repeated as previously described. If the amount of fuel flowing is now much greater than that previously obtained, the fault is to be found in the intake line 20.

The can 13 is preferably provided with a handle 57 and at its side with a spout 58 which is preferably bifurcated by the partition 14, so that as the can is tilted both the chambers 15 and 16 are emptied simultaneously through the spout. In Fig. 7 is shown a modified form of the device in which the operator opens a valve permitting the flow of fuel from the fuel pump to a measuring device of the valve, being operably connected to a clockwise mechanism which is automatically started at the instant the valve opens, and which continues to operate for a predetermined length of time, at the end of which it stops the automobile engine by shorting the ignition.

Figure 8:
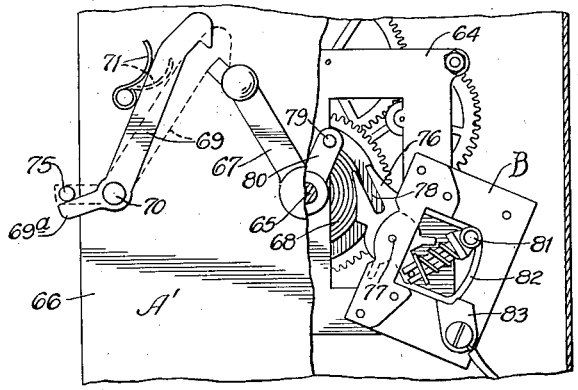
Fig. 8 is a horizontal section on the broken line 8—8 of Fig. 7.

The embodiment, as shown in Figs. 7 and 8, comprises a measuring can 60 having a measuring tube 61 and a graduated scale 62 for measuring the quantity of liquid therein. This can has a removable lid 63 upon which is mounted a clockwork mechanism designated generally as A' which has a frame 64 in which is suitably journaled an operating shaft 65, which extends through a case 66 and has keyed thereon an operating lever 67. This clockwork mechanism is quite similar to that shown in Figs. 1 to 6 inclusive and winds up a spring 68 as the shaft is turned in a counter-clockwise direction, as shown in Fig. 8, so that the spring tends to drive it in a clockwise direction.

As the lever 67 is drawn back in a counter-clockwise direction it passes under a detent 69 which is pivotally mounted at 70, and is urged toward the lever 67 by means of a spring 71. Thus as the lever 67 is drawn back the detent catches and holds it in that position so that the clockwork mechanism will not start until the lever 67 is released. The can 60 preferably has a handle 72 above which is located a valve 73 which connects through a pipe 24ª with a T-fitting 23ª between the pump P' and the pipe 21ª leading to the carburetor, not shown, but connected up substantially as shown in Fig. 1, except that in this form the pressure gauge is omitted.

The valve 73 preferably takes the form of a petcock which is operated by means of a lever 74 which can be reached by the thumb of the operator while holding the handle of the can. The lever 74 carries a finger 75 which is adapted to engage an extension 69ª, so that as the valve 73 is opened the detent 69 is retracted from the dotted line position to the full line position of Fig. 8. This releases the lever 67 which immediately starts the clockwork mechanism which then operates for a predetermined adjusted time, at the end of which the switch B is closed and the clockwork mechanism brought to a stop, as will now be explained.

The snap switch B is of a well known type and need not be explained in detail, except to say that it has a lever 76 which is pivotally mounted at 77, and has a longitudinal slot 78 which is so placed in the off position of the switch as to receive a pin 79 on a lever arm 80 which is keyed on the shaft 65. Thus as this shaft revolves in a clockwise direction the pin 79 causes the lever 76 to move in a counter-clockwise direction until it reaches a position where a metal roller 81 is suddenly caused to roll across an arcuate track 82, thereby making engagement with metal terminals 83 and 83ᵃ on opposite sides of the switch and closing it. At substantially the same time the lever 76 strikes a portion of the body of the switch, thereby stopping the rotation of the shaft 65 and thus stopping the clockwork mechanism.

The switch B, as shown in Fig. 7, is shown connected so as to short circuit the primary winding of the spark coil 84. Thus the spark coil has primary and secondary windings P and S, respectively, the primary winding having a lead 85 to ground through the car battery 86, and a lead 87 to a breaker arm 88 on a make and break device 89 on the distributor. The secondary of the spark coil is connected through a lead 90 to a distributor 91 in a well known manner.

The terminal 83 of the switch B connects through a lead 92 with the lead 87, while the terminal 83ᵃ connects through a lead 93 to ground. Thus it will be seen that when the switch B is closed, the spark coil will be short circuited to ground so that no current will flow therethrough, and consequently no spark will be produced on opening the points of the distributor. It will be observed that this means of short circuiting the ignition is illustrative only, as other means of accomplishing this purpose could be used.

Thus it will be seen that with the device of Fig. 7 connected to the delivery line from the fuel pump and to the automobile ignition system, and with the automobile engine running at a speed substantially equivalent to a road speed of 30 to 35 miles per hour, the operator opens the valve 73 thereby causing fuel from the pump to be delivered to the measuring chamber 60, and at the same time starting the clockwork mechanism which continues for a predetermined length of time, as one minute, at the end of which the engine is stopped by short circuiting the ignition, thereby stopping the flow of gasoline to the measuring chamber. The quantity of gasoline thus pumped can then be read on the scale 62, as previously described.

In Figs. 9 to 12 inclusive is shown still another modification of the mechanism. This comprises a measuring can 94 having any convenient form of measuring device, such as the tube 61 and scale 62 of Fig. 7, but which for convenience are here omitted. A lid or cap 95 is removably fitted over the top of the can and carries a clockwork mechanism A², which will now be described in some detail.

This mechanism in general has the characteristic of starting at the instant gasoline begins to flow into the measuring chamber and of stopping the flow of gasoline to the chamber at the end of a predetermined period, after which the amount of gasoline flowing during this period can then be measured. This clockwork mechanism comprises a framework having two spaced plates 96 and 97, the latter having secured therein a stud 98 (Fig. 12) upon which is rotatably mounted an arm 99 which is normally urged in a counter-clockwise direction, as shown in Fig. 10, by means of a fairly powerful spring 100, the inner end of which is connected to the stud 98.

A timing cam lever 101 is also rotatably mounted on the stud 98 and is held in place by means of a spring disk 102, which is retained in place by riveting the inner end of the stud 98. This riveted end is also axially cupped to rotatably receive the inner end of a shaft 103, the opposite end of which is reduced and journaled in the plate 96. This shaft has a hub 104 pressed thereon. At one end of the hub is secured a quadrant 105, whose purpose will later be explained. At the opposite end of the hub is rotatably mounted a gear 106 between friction disks 107 and 108 which are retained by riveting the outer end of the hub.

The gear 106 is the last of a train of gears 106, 109, 110, and ending in an escapement wheel 111 which is operably connected in a well known manner to a balance wheel 112. The arm 99 extends both ways from the stud 98, the lower end of the arm carrying a pin 113 upon which is pivotally mounted a pawl 114 which is normally urged toward the quadrant 105 by means of a spring 115. The pawl 114 has a shoulder 116 which is adapted to engage the lower end of the quadrant 105, and a hook 117 which is adapted to engage a shoulder 118 on the quadrant. The pawl carries a pin 119 on which is rotatably mounted a roller 120 which is adapted to engage a sloping face of a cam 101ᵃ on an arm carried by the timing cam lever 101.

The upper end of the arm 99 is pivotally connected through a link 121 to an operating lever 122 which is pivotally mounted at 123. A spring 124 normally urges this operating lever to the left, as shown in Fig. 10, thereby assisting the action of the spring 100. The operating lever 122 (Fig. 9) is connected through a link 125 with a valve lever 126, which serves to operate a valve 127 which controls the flow of fuel through a passage 128 which connects through a T-fitting 23ᵇ with a pump P² which delivers through a pipe 21ᵇ to a carburetor, not shown. The valve 127 is in a closed position, as shown in full lines, and in open position as shown in dotted lines.

Thus it will be seen that as the valve 127 is opened by throwing the valve lever 126 from the full line to the dotted line position, the arm 99 will be rotated in a clockwise direction, thereby causing the shoulder 116 to engage the lower end of the quadrant 105 and forcing this quadrant, the hub 104, and the friction disks 107 and 108 around in a clockwise direction while the gear 106 is held stationary by its driving pinion. When the lever 126 is released and the hook 117 of the pawl has engaged the shoulder 118, and as the arm 99 now tends to rotate in a counter-clockwise direction under pressure of the spring 100 drags the quadrant with it. This quadrant then drives the gear 106 through the friction disks, and this motion is carried through the gear train 106, 109, 110 to the escapement wheel 111.

The clockwork mechanism thus having been started at the instant the valve lever 126 is moved to the dotted line position continues to operate under the pressure of the spring 100, and the parts carried by the arm 99 rotate slowly in a counter-clockwise direction. As they do so the roller 120 rides up on the inclined cam face 101ᵃ, and as it does so lifts the hook 117 out of engagement with the shoulder 118 whereupon the spring 100 will instantly urge the members back to the full line position of Fig. 9, thereby stopping the clock and at the same time closing the valve 127.

Thus it will be seen that by this mechanism the valve 127 is opened and the clockwork mechanism started in operation at the same time. The timing of the clockwork mechanism is accomplished by moving the timing cam lever 101. Thus the further it is carried to the left, as shown in Fig. 9, the longer the clockwork mechanism will operate before the cam 101ª lifts the hook 117 and brings the mechanism to a stop. By setting this mechanism therefore so that it will operate for a desired period of time, such as one minute, and by hooking this apparatus up, as indicated, to the delivery line of the fuel pump of an automobile and operating the engine of the automobile at a speed equivalent to a normal road speed of 30 to 35 miles per hour, I am able to measure the amount of fuel delivered by the pump for this given period of time.

It will be understood that where desired a pressure gauge, such as the gauge 56 of Fig. 1, may be employed in connection with any of the pump gauging mechanisms here shown. In making the capacity test there is no need for referring to the pressure gauge as in the capacity test I have no interest in the minimum or maximum pressure, but rather to determine that a sufficient amount of fuel is flowing. In making this capacity test I should find that a flow of one pint is obtained in one minute, or forty-five seconds, or less, the exact amount in a given time depending upon the type of fuel pump used. This would be known in advance of the test. If the required amount, say one pint, or more, is delivered in the maximum time specified, the carburetor will never starve for a fuel at any speed. In many instances the test may disclose that more than one pint of fuel will flow in the time specified. This is not an indication that the fuel pump is defective. Rather it shows that the fuel pump is most efficient. Where the flow, however, is greater than the minimum required, it is always then advisable to make the second, or pressure test, to insure against excessive pressure in the pipe leading to the carburetor.

In making the second, or pressure test, it is only necessary to determine that the pump does not produce an over-pressure. If a lesser pressure is developed than shown as a maximum on the chart for the pump which is being tested, this is no indication that the pump is defective, but rather gives assurance that the pump is within the prescribed limit as to pressure. So long as the pump does not show a pressure over the maximum allowable, but does give at least the minimum flow in the capacity test, the pump shows efficient operation both from the standpoint of the amount of fuel delivered and the pressure at which that fuel is delivered to the carubretor.

Instead of varying the time for which the clockwork mechanism is set, it may be desirable to set this for a definite time, say one minute, and vary the amount to be pumped accordingly. Thus the graduated scale could show prominently markings corresponding to one pint and one and one-third pints, which correspond to the rate of one pint in one minute and in forty-five seconds, respectively.

I claim:

1. A device for determining the efficiency and operating characteristics of a fuel pump while it is supplying fuel to the carburetor of the engine to which it is operatively connected, comprising a valve controlled outlet communicating with the carburetor supply line whereby the fuel supply in excess of carburetor requirements at any selected motor speed may be diverted, a measuring device for receiving fuel diverted through said outlet, and time controlled means for maintaining said outlet in communication with said measuring device for a predetermined period.

2. A device for determining the efficiency and operating characteristics of a fuel pump while it is supplying fuel to the carburetor of the engine to which it is operatively connected, comprising a valve controlled outlet communicating with the carburetor supply line whereby the fuel supply in excess of carburetor requirements at any selected motor speed may be diverted, a waste chamber and a measuring chamber for receiving fuel diverted through said outlet, time controlled means for maintaining said outlet in communication with said measuring chamber for a predetermined period and thereafter with said waste chamber, and means associated with said measuring chamber for indicating the amount of fuel therein.

3. A device for determining the efficiency and operating characteristics of a fuel pump while it is supplying fuel to the carburetor of the engine to which it is operatively connected, a valve controlled outlet communicating with the carburetor supply line whereby the fuel supply in excess of carburetor requirements at any selected motor speed may be diverted, time controlled means set into operation upon the opening of said valve for maintaining said valve open for a predetermined period, a measuring chamber for receiving the directed fuel, and means associated with said chamber for indicating the amount of fuel therein.

4. A device for determining the efficiency and operating characteristics of a fuel pump while it is supplying fuel to the carburetor of the engine to which it is operatively connected, a valve controlled outlet communicating with the carburetor supply line whereby the fuel supply in excess of carburetor requirements at any selected motor speed may be diverted, time controlled means set into operation upon the opening of said valve for maintaining said valve open, a measuring chamber for receiving the diverted fuel, a switch controlled by said time controlled means for short circuiting the ignition circuit of the engine, thereby stopping the flow of fuel from the pump at the end of a predetermined period, and means for indicating the amount of fuel in said chamber.

5. A device for determining the efficiency and operating characteristics of a fuel pump while it is supplying fuel to the carburetor of the engine to which it is operatively connected, comprising a casing divided into a waste chamber and a measuring chamber, a passage leading to both chambers, a clock mechanism, a valve in said passage operatively connected to the clock mechanism so that the valve closes communication between the passage and waste chamber and opens communication between the passage and measuring chamber while the clock is in operation and vice versa when the clock mechanism reaches a predetermined position in which it is stopped, whereby fuel is diverted to the measuring chamber when the clock is in operation and to the waste chamber when the clock is not in operation.

6. A device for determining the efficiency and operating characteristics of a fuel pump while it is supplying fuel to the carburetor of the engine to which it is operatively connected, comprising a casing divided into a waste chamber and a measuring chamber, a passage leading to both chambers, a clock mechanism, a valve in said passage operatively connected to the clock mechanism so that the valve closes communication between the passage and waste chamber and opens communication between the passage and measuring chamber while the clock is in operation and vice versa when the clock mechanism reaches a predetermined position in which it is stopped, whereby the fuel is pumped to the measuring chamber when the clock is in operation and to the waste chamber when the clock is not in operation, and means associated with the measuring chamber for measuring the amount of fuel therein.

7. A device for determining the efficiency and operating characteristics of a fuel pump while it is supplying fuel to the carburetor of the engine to which it is operatively connected, comprising a measuring chamber, manually set time controlled means interposed in the fuel line between the pump and carburetor for diverting fuel in excess of carburetor requirements at any selected engine speed while the pump is in normal operation by the engine to said measuring chamber for a predetermined period, the time controlled means operating to stop the flow of fuel to said measuring chamber at the end of said time, and means for indicating the amount of fuel in said chamber.

8. A device for determining the efficiency and operating characteristics of a fuel pump while supplying the carburetor of the engine to which it is operatively connected, comprising fluid measuring means, and time controlled means interposed in the supply line between the carburetor and pump for diverting fuel from the pump in excess of carburetor requirements at any selected motor speed to said measuring means for a predetermined length of time.

9. A device for determining the efficiency and operating characteristics of a fuel pump while supplying the carburetor of the engine to which it is operatively connected, comprising fluid measuring means, means connected to the outlet side of said pump and operable to divert fuel to said fluid measuring means in excess of carburetor requirements at a selected motor speed, said means including a time controlled mechanism, and means operable by said time controlled mechanism for interrupting the flow of fuel to said fluid measuring means after a predetermined period.

BUTLER J. HASKINS.